(No Model.)

S. BIRD.
POISON DISTRIBUTER.

No. 599,216. Patented Feb. 15, 1898.

Witnesses
E. A. Ryan.
J. L. Caplinger

Inventor
Stephen Bird.
By his Attorneys.
C. A. Snow & Co.

THE NORRIS PETERS CO., PHOTO-LITHO., WASHINGTON, D. C.

UNITED STATES PATENT OFFICE.

STEPHEN BIRD, OF BIRD POINT, MISSOURI.

POISON-DISTRIBUTER.

SPECIFICATION forming part of Letters Patent No. 599,216, dated February 15, 1898.

Application filed June 14, 1897. Serial No. 640,688. (No model.)

*To all whom it may concern:*

Be it known that I, STEPHEN BIRD, a citizen of the United States, residing at Bird Point, in the county of Mississippi and State of Missouri, have invented a new and useful Poison-Distributer, of which the following is a specification.

This invention relates to certain improvements in poison-distributers, such as are used for applying lime, London purple, paris-green, and other insecticides to potato, tomato, and other growing plants, such as are usually grown in rows; and the object of the invention is to provide a device of this character of a simple and inexpensive nature adapted to be rolled or pushed along the rows and provided with means for automatically supplying the poison to the plants.

The invention consists in a device of this character comprising ground-wheels, an axle connecting and turning with said wheels, a draft-frame wherein said axle is arranged to turn, a poison-receptacle carried on the axle and having perforations in its ends through which the axle extends, means for holding the receptacle against turning, said receptacle having a foraminous bottom for the discharge of the poison, and an agitator driven from the axle inside the receptacle.

The invention also contemplates certain novel features of the construction and combination and arrangement of the various parts of the improved poison-distributer whereby certain important advantages are attained and the device is made simpler, cheaper, and otherwise better adapted for use, all as will be hereinafter fully set forth.

The novel features of the invention will be carefully defined in the claims.

In order that my improvements may be the better understood, I have shown in the accompanying drawings a poison-distributer constructed in accordance with the invention, in which drawings—

Figure 1:
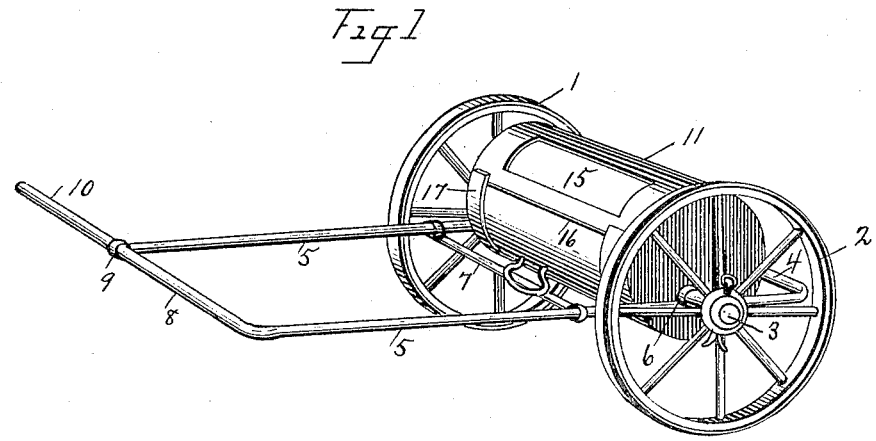
Figure 2:
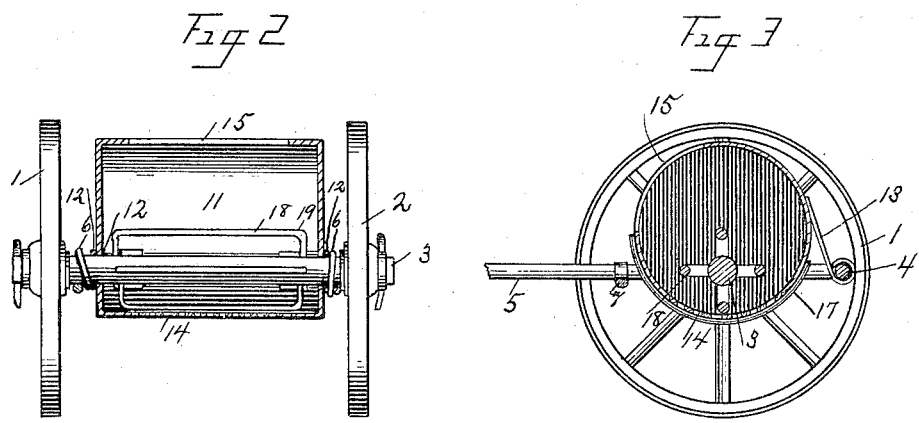
Figure 3:
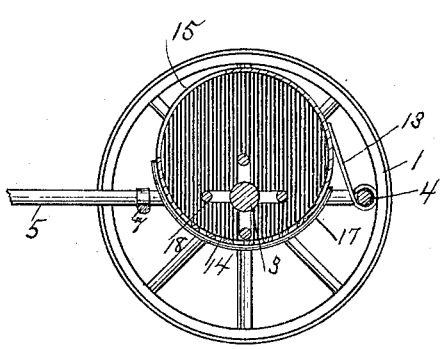
Figure 4:
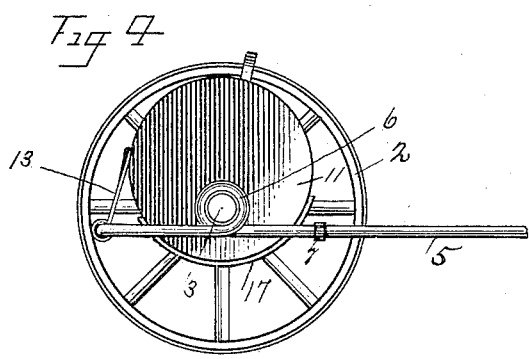
Figure 5:
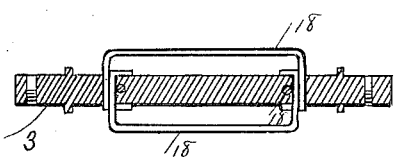

Figure 1 is a perspective view of the device. Fig. 2 is a transverse section showing the axle with the agitator-blades and wheels carried thereon in elevation. Fig. 3 is a longitudinal section taken vertically through the poison-receptacle of the device. Fig. 4 is a side view of the device, one of the wheels being removed. Fig. 5 is a sectional detail view taken longitudinally through the axle and showing the arrangement of the agitator-blades thereon.

In the views, 1 and 2 indicate the ground-wheels of the improved distributer, and 3 indicates the axle connecting said wheels, one of the ground-wheels 2 being fixed to the axle, so that said axle will be rotated by the turning of said wheel.

As shown in the drawings, the draft-frame of the improved distributer is formed of a stout metal wire or rod, bent to form a cross-bar 4, extending transversely across the rear part of the frame, from opposite ends of which cross-bar extend forward the side bars 5 of the draft-frame, each of said bars 5 being bent to form a loop or eye 6, adapted to receive the axle and form a bearing therefor, as clearly shown in Fig. 4.

The side bars 5 of the draft-frame are connected together forward of the axle by means of a cross-bar 7, the opposite ends of which are bent around said side bars, as shown in Fig. 1, and the forward extremities of the side bars are connected together by means of a cross-piece 8, integral with the end of one of the side bars 5 and having its extremity extended through a loop or eye 9 in the extremity of the other side bar 5, as shown in Fig. 1. The extremity 10 of said cross-piece 8 projects at one side of the draft-frame, as shown in the drawings, so as to permit the distributer to be drawn along the rows by a person walking at one side thereof, as will be readily understood.

11 indicates the poison-receptacle, formed, as seen in the drawings, of a sheet-metal drum having closed ends, each of which is provided with a flanged opening 12 for the passage of the axle, which extends longitudinally through said drum or receptacle 11 at the lower part thereof, and in order to hold said drum or receptacle against rotative movement I provide the draft-frame with a brace 13, extending from the rear cross-bar 4 upward to the rear part of the drum or receptacle 11, as shown clearly in Figs. 2 and 4.

In the bottom of the drum or receptacle 11 are formed a series of perforations 14 for the passage of the poison carried in said receptacle, and in order to permit the receptacle to be filled with poison I provide an opening 15 at the upper part thereof, said opening 15 being adapted to be closed when the receptacle or drum is filled by means of a slide-cover 16, mounted in curved guides 17, secured to the surface of the drum or receptacle adjacent to the opposite ends thereof. As shown herein, the slide-cover 16 is adapted also to be pushed downward, so as to close the perforations in the bottom of the drum or receptacle.

In order to stir or agitate the poison carried in the receptacle or drum 11, I provide the axle with a series of agitator-blades 18, extending longitudinally along the same inside the drum, as shown in Figs. 2 and 5, each of said blades being formed of a piece of stout metal wire, as herein shown, the ends of the wire being bent at right angles, as shown at 19 in Fig. 5, and being passed through the axle 3 and clenched at the opposite sides thereof in order to hold the blades in place.

In operation the poison will be supplied to the receptacle or drum 11 through the opening in the top thereof, the slide-cover being for this purpose moved downward, so as to close the openings in the bottom of the drum, and when it is desired to transport the device from place to place—as, for example, from one field to another—the said slide-cover may be arranged in this position, so as to prevent the poison in the receptacle or drum 11 from passing through the perforations in the bottom of the receptacle.

When it is desired to apply the poison to the growing plants, the device is rolled along the row of plants, the wheels 1 and 2 running on opposite sides thereof, and by their connection with the axle 3, which extends through the drum or receptacle and is provided with agitator-blades inside thereof, said wheels will act to sprinkle the poisonous powder upon the plants. The projecting end portion 10 of the forward cross-piece 8 of the draft-frame permits the person using the device to walk at one side of the row of plants to which the poison is being applied.

From the above description it will be seen that the improved distributer is of an extremely simple and inexpensive nature and is especially well adapted for the purposes for which it is designed, and it will be obvious from the above description that the invention is capable of some modification without material departure from its principles and spirit, and for this reason I do not wish to be understood as limiting myself to the exact form and arrangement of the parts, as hereinafter set forth.

Having thus described the invention, what I claim is—

1. In a poison-distributer, the combination of ground-wheels, an axle connecting and arranged to turn with the wheels, a draft-frame wherein the axle is arranged to turn, a cylindrical poison-receptacle carried on the axle and secured against turning thereon, said receptacle having perforations in its lower side for the discharge of the poison, and a filling-aperture in its upper side, a curved cover supported in ways to slide circumferentially on the receptacle to close either the filling-aperture or the discharge-openings, substantially as described.

2. In a poison-distributer, the combination of ground-wheels, an axle connecting and driven from said ground-wheels, a draft-frame in which the axle is arranged to turn, a poison-receptacle consisting of a drum having perforations in its bottom for the discharge of the poison and having a filling-aperture in its top, the opposite ends of the drum being perforated for the passage of the axle through the drum, an agitator inside the drum and driven from the axle, guides extending along the ends of the drum on the outer surface thereof, and a slide-cover mounted in said guides and adapted to close the perforations in the bottom of the drum, said cover being also adapted to close the filling-aperture in the drum, substantially as set forth.

3. In a poison-distributer, the combination of ground-wheels, an axle connecting and driven from said wheels, a draft-frame wherein the axle is mounted to turn, a poison-receptacle having openings in its ends for the passage of the axle, said receptacle having perforations in its bottom for the discharge of the poison, and agitator-blades extending longitudinally of the axle inside the drum and having their end portions bent and secured to the axle, substantially as set forth.

4. In a poison-distributer, the combination of ground-wheels, an axle connecting and driven from said wheels, a draft-frame formed of a metal wire or rod bent to form a rear cross-bar and side bars, each of said side bars being bent to form a loop embracing the axle, a poison-receptacle having a perforated bottom and provided in its ends with openings through which the axle extends, and an agitator in the receptacle and driven from the axle, substantially as set forth.

5. In a poison-distributer, the combination of ground-wheels, an axle connecting and driven from the ground-wheels, a draft-frame comprising side bars connected to the axle, and a cross-piece connecting said side bars at their forward ends and having one extremity projecting beyond one of the side bars to one side of the path of the distributer, a poison-receptacle having perforations for the discharge of the poison, and an agitator in the receptacle driven from the axle, substantially as set forth.

In testimony that I claim the foregoing as my own I have hereto affixed my signature in the presence of two witnesses.

STEPHEN BIRD.

Witnesses:
EMMA S. RILEY,
EDWARD L. GILBERT.